(12) United States Patent
Katabi et al.

(10) Patent No.: US 9,882,419 B2
(45) Date of Patent: Jan. 30, 2018

(54) ADAPTIVE CONTROL OF WIRELESS POWER TRANSFER

(71) Applicant: Massachusetts Institute of Technology, Cambridge, MA (US)

(72) Inventors: Dina Katabi, Cambridge, MA (US); Lixin Shi, Cambridge, MA (US); Zachary Edward Kabelac, Somerville, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 179 days.

(21) Appl. No.: 14/724,156

(22) Filed: May 28, 2015

(65) Prior Publication Data
US 2016/0190855 A1    Jun. 30, 2016

Related U.S. Application Data

(60) Provisional application No. 62/117,105, filed on Feb. 17, 2015, provisional application No. 62/098,577, filed on Dec. 31, 2014.

(51) Int. Cl.
| | | |
|---|---|---|
| H02J 7/04 | (2006.01) | |
| H02J 50/40 | (2016.01) | |
| H02J 50/12 | (2016.01) | |
| H02J 50/80 | (2016.01) | |

(52) U.S. Cl.
CPC .............. *H02J 7/045* (2013.01); *H02J 50/12* (2016.02); *H02J 50/40* (2016.02); *H02J 50/80* (2016.02)

(58) Field of Classification Search
CPC ...................................................... H02J 7/025
USPC .......................................................... 320/108
See application file for complete search history.

(56) References Cited

U.S. PATENT DOCUMENTS

| | | | |
|---|---|---|---|
| 7,211,986 B1 | 5/2007 | Flowerdew et al. | |
| 7,248,017 B2 | 7/2007 | Cheng et al. | |
| 7,893,564 B2 * | 2/2011 | Bennett | H02J 17/00 307/104 |
| 8,258,653 B2 * | 9/2012 | Kitamura | H02J 5/005 307/104 |
| 8,947,046 B2 | 2/2015 | Ichikawa et al. | |
| 9,425,864 B2 | 8/2016 | Staring | |
| 9,443,651 B2 | 9/2016 | Kagami et al. | |
| 2009/0096413 A1 * | 4/2009 | Partovi | H01F 5/003 320/108 |
| 2011/0133691 A1 | 6/2011 | Hautanen | |
| 2011/0156493 A1 | 6/2011 | Bennett | |

(Continued)

FOREIGN PATENT DOCUMENTS

| | | |
|---|---|---|
| EP | 2211438 | 7/2010 |
| EP | 2211438 | 8/2010 |

(Continued)

*Primary Examiner* — Samuel Berhanu
*Assistant Examiner* — Tessema Kebede
(74) *Attorney, Agent, or Firm* — Occhiuti & Rohlicek LLP

(57) ABSTRACT

A method for wireless power transfer adapts to changing configuration of receivers, including changes in number of, location and/or orientation of, magnetic coupling to, and load of circuits (e.g., battery charging circuits) of one or more receivers. The adaptation can be performed without interrupting optimal or near-optimal power transfer to the receivers, and can provide a measure of fairness among multiple receivers.

38 Claims, 5 Drawing Sheets

(56) References Cited

U.S. PATENT DOCUMENTS

| | | |
|---|---|---|
| 2012/0082652 A1* | 4/2012 | Sengun ................. A61M 1/029 |
| | | 424/93.72 |
| 2012/0169139 A1* | 7/2012 | Kudo ..................... H02J 17/00 |
| | | 307/104 |
| 2012/0293008 A1 | 11/2012 | Park et al. |
| 2013/0002034 A1 | 1/2013 | Onizuka |
| 2013/0043734 A1* | 2/2013 | Stone ................... H04B 5/0037 |
| | | 307/104 |
| 2013/0193773 A1* | 8/2013 | Van Wageningen .... H02J 7/025 |
| | | 307/104 |
| 2013/0207599 A1 | 8/2013 | Ziv et al. |
| 2013/0278209 A1 | 10/2013 | Von Novak, III |
| 2014/0084703 A1 | 3/2014 | Hall et al. |
| 2014/0091640 A1 | 4/2014 | Scholz et al. |
| 2014/0117930 A1 | 5/2014 | Imazu et al. |
| 2015/0236513 A1 | 8/2015 | Covic et al. |
| 2015/0302983 A1 | 10/2015 | Park et al. |

FOREIGN PATENT DOCUMENTS

| | | |
|---|---|---|
| EP | 2518861 | 10/2012 |
| EP | 2688181 | 1/2014 |
| WO | 2012/150293 | 11/2012 |
| WO | 2013/122483 | 8/2013 |
| WO | 2014/109460 | 7/2014 |

* cited by examiner

ADAPTIVE CONTROL OF WIRELESS POWER TRANSFER

CROSS-REFERENCE TO RELATED APPLICATIONS

This application claims the benefit of U.S. Provisional Application No. 62/098,577, filed Dec. 31, 2014, and U.S. Provisional Application No. 62/117,105, filed Feb. 17, 2015, the contents of which are incorporated herein by reference.

This application is related to but does not claim the benefit of U.S. application Ser. No. 14/502,191, titled "WIRELESS POWER TRANSFER," filed Sep. 30, 2014, which claims the benefit of U.S. Provisional Application No. 62/046,999, filed Sep. 7, 2014, and of U.S. Provisional Application No. 61/939,801, filed Feb. 14, 2014, the contents of each of the above-referenced applications being incorporated herein by reference.

STATEMENT AS TO FEDERALLY SPONSORED RESEARCH

This invention was made with government support under CNS-1116864 awarded by the National Science Foundation. The government has certain rights in the invention.

BACKGROUND

This invention relates to wireless power transfer, and in particular relates to adaptive control of wireless power transfer using multiple controlled sources.

Wireless power transfer promises to revolutionize mobile communication and enable smart phones and other portable or fixed wireless devices to be permanently unplugged. Wireless chargers are now available for many mobile phones, for example, in the form of charging pads on which a user places a phone. Power is transferred using magnetic fields generated in transmitting coils in the charging pad and received at a receiving coil in the device being charged. Some state-of-art phone chargers are limited to distances of one or few centimeters, and in many cases requires the device being charged to be carefully aligned with the charging pad.

SUMMARY

In a general aspect, a method for wireless power transfer adapts to changing configuration of receivers, including changes in number of, location and/or orientation of, magnetic coupling to, and load of circuits (e.g., battery charging circuits) of one or more receivers. The adaptation can be performed without interrupting optimal or near-optimal power transfer to the receivers, and can provide a measure of fairness among multiple receivers.

In one aspect, in general, a method for wireless power transfer uses a transmitter having a plurality of transmitter coils that are magnetically coupled to one or more receiver coils. The one or more receiver coils are electrically coupled to one or more circuits wirelessly powered from the transmitter. First data characterizing an electrical effect on the transmitter of the one or more receiver coils electrically coupled to the one or more circuits, is maintained. This first data is used to determine second data characterizing a periodic excitation of the plurality of transmitter coils, and application of the periodic excitation to the plurality of transmitter coils is caused according to the second data. Maintaining the first data includes updating the first data using third data characterizing a response of each transmitting coil to the periodic excitation applied to the plurality of transmitting coils.

Aspects can include one or more of the following features.

The one or more receiving coils comprises a plurality of receiving coils.

The one or more circuits comprise a plurality of circuits, with each circuit of the plurality being coupled to a different receiving coil of the plurality of receiving coils.

At least one of the one or more receiving coils is movable relative to the transmitting coils of the transmitter.

The first data depends at least in part on location of the one or more receiving coils relative to the transmitting coils, and wherein maintaining the first data includes adapting to changing location of the one or more receiving coils.

The one or more circuits apply a load to each of the one or more receiving coils, and the first data depends at least in part of the loads applied to the one or more receiving coils.

The load applied to at least one of the receiving coils varies over time, and maintaining the first data includes adapting to changing load applied to said at least one of the receiving coils.

The first data depends at least in part on magnetic coupling between each transmitting coil of the plurality of transmitting coils and each receiving coil of the one or more receiving coils, and maintaining the first data comprises adapting to changes in that magnetic coupling.

The first data depends at least in part on magnetic coupling between the transmitting coils of the plurality of transmitting coils.

The first data further depends at least in part on magnetic coupling between the receiver coils of the one or more receiver coils.

At least one of the circuits comprises a charging circuit for a battery.

The electrical effect on the transmitter of the one or more receiver coils depends at least in part on a charging state of a battery.

A load of the charging circuit on a receiver coil coupled to the charging circuit depends on the charging state of the battery Maintaining the first data includes adapting to the charging state of one or more batteries.

Causing the excitation of the plurality of transmitter coils comprises controlling one or more power conversion circuits electrically coupled to the plurality of transmitter coils.

The method further includes measuring the response of each transmitting coil to determine the third data. For instance, measuring the response of each transmitting coil includes measuring a current in each transmitting coil, and more particularly includes measuring a magnitude and phase of the current in each transmitting coil. In some implementations, measuring the current includes sensing the current using an inductive coupling to each of the transmitting coils.

A series of iterations are performed, with each iteration including determining the second data, causing the excitation of the transmitter coils, and updating the first data.

The iteration is performed during substantially continuous transfer of power via the plurality of transmitter coils and the one or more receiver coils.

Determining the second data includes substantially optimizing (e.g., maximizing for a fixed input power at the transmitter) transfer of power via the one or more receiver coils.

The second data is determined without requiring communication (i.e., in band or out-of-band) between transmitters and receivers.

The second data characterizing the excitation of the plurality of transmitter coils comprises data characterizing at least one of a voltage excitation and a current excitation for at least some of said transmitter coils.

The second data characterizing the excitation of the plurality of transmitter coils comprises data characterizing a phase of the periodic excitation for at least some of the transmitter coils.

The second data characterizes a voltage and a phase of periodic excitation of each of the transmitter coils.

The method further includes detecting a change in a number of the one or more receiving coils in proximity to the transmitter according to the third data.

Detecting the change in a number of the one or more receiving coils in proximity to the transmitter includes determining that the electrical effect characterized by the first data is inconsistent with the third data.

The method further includes, during a period in which no receiving coil is in a proximity to the transmitter, detecting entry of a receiver coil of the one or more receiver coils into the proximity of the transmitters, and initializing the first data upon entry of said receiver coil.

Detecting entry of the receiver coil includes iteratively causing excitation of successively different subsets of the plurality of transmitting coils (e.g., a single transmitting coil) in each of a succession of detection cycles, and using the third data characterizing a response of each transmitter coil to detect the entry of the receiver coil.

Causing excitation of a subset of the plurality of transmitter coils includes controlling one or more power conversion circuits electrically coupled to the plurality of transmitter coils to apply a drive to each of the transmitter coils.

Fourth data characterizing the excitation of the plurality of transmitter coils such that in the absence of a receiver coil entering the proximity of the transmitter, current in transmitter coils outside the selected subset is substantially zero is determined, and causing excitation of the subset of the plurality of transmitter coils includes causing excitation of the plurality of transmitter coils according to the fourth data.

In another aspect, in general, a wireless power transfer system includes a plurality of transmitter coils, one or more power conversion circuits controllable to apply an excitation to each of the plurality of transmitter coils, measurement circuits for measuring a response at each of the transmitter coils to the excitation of said coils, and a controller coupled to the power conversion circuits and to the measurement circuits. The controller is configured to perform all the steps of any of the methods set forth above.

In some embodiments, the controller comprises a processor and a non-transitory machine readable medium comprising instructions stored thereon for causing the processor to perform all the steps of any of the methods set forth above.

In another aspect, in general, software embodied on a non-transitory machine-readable medium comprises instructions for causing software-implemented controller of a wireless power transfer system to perform all the steps of any of the methods set forth above.

An advantage of one of more aspects includes adapting to changing locations, loads, and/or magnetic coupling of receiver coils while being able to maintain a substantially continuous power transfer via the receiver coils.

Another advantage of one or more aspects includes applying an optimal or close-to-optimal power transfer via the receivers, without necessarily requiring communication from the receivers or interruption of power transfer for estimation of coupling of the receiver coils to the transmitter coils.

Another advantage or one or more aspects is an inherent fairness of power transfer among multiple receivers. For example, in at least some embodiments, when wirelessly charging multiple batteries, power is preferentially directed to a battery with a least degree of charge.

Another advantage of one or more aspects is the no in-band or out-of-band communication is required from the receivers to the transmitter. Although such communication may be used, for example, to determine relative weighting of the degree of power transfer to different receivers, in general such communication is not required by one or more embodiments of the adaptation approach.

Another advantage of one or more aspects is that the approach is not dependent on the geometry of the transmit coils and/or knowing the geometry. Furthermore, at least some embodiments can adapt to a changing geometry and/or changing coupling between transmit coils.

Another advantage of one or more aspects that the foreign objects may be detected and/or adapted to.

Other features and advantages of the invention are apparent from the following description, and from the claims.

DESCRIPTION

1 Overview

Figure 1:
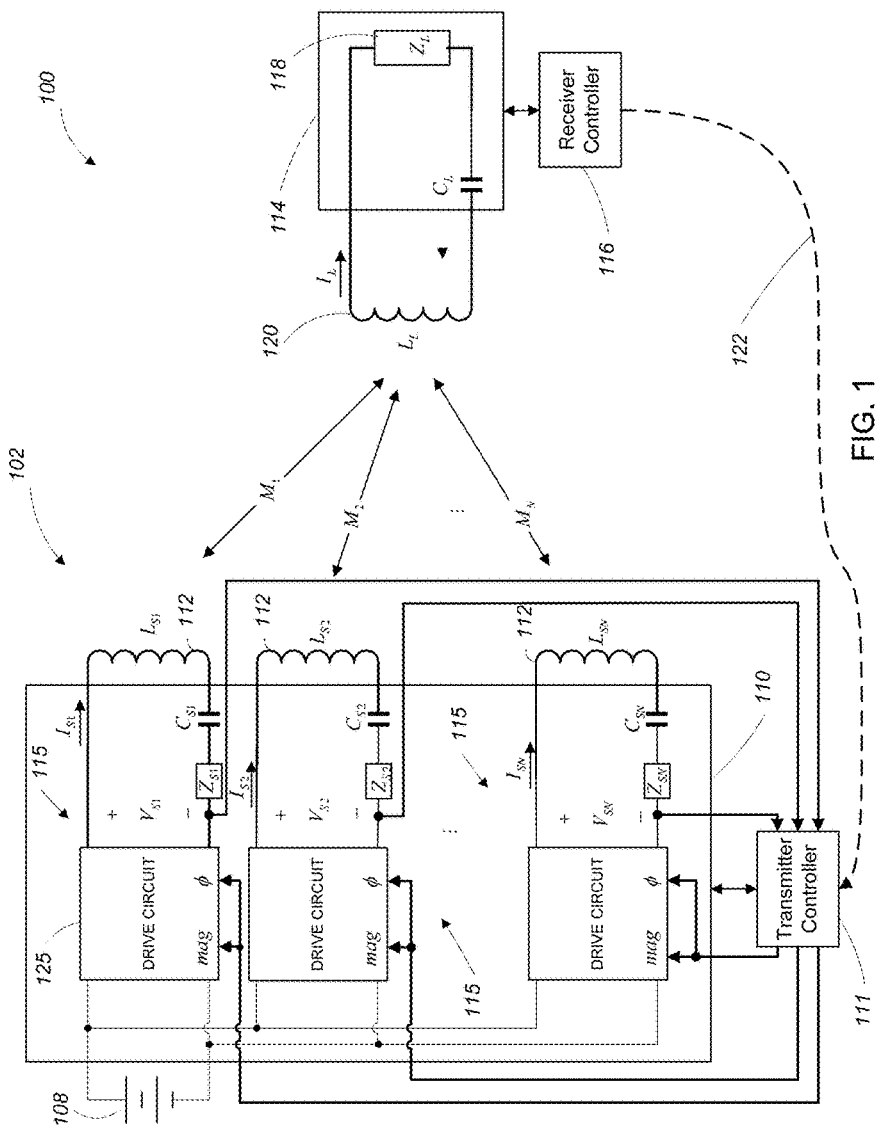
FIG. 1 is a block diagram of a single receiver wireless power transfer system.

Referring to FIG. 1, an embodiment of a wireless power transfer system 100 is configured to transfer power without requiring a conductive link (i.e., a charging wire) to device(s) receiving power, for example, for charging a battery of a personal wireless device (e.g., a smartphone) or a fixed or moveable household device (e.g., a lamp), while overcoming limitations related to distance and/or orientation of currently available approaches. The wireless power transfer system 100 includes a transmitter 102 and one or more receivers 104, a representative one of which is shown in FIG. 1. The transmitter 102 is configured to wirelessly transfer power to the receiver 104 using magnetic coupling between the transmitter 102 and the receiver 104. The description below first addresses the single-receiver case, and then provides further description of embodiments that support concurrent power transfer to multiple receivers. The description below also generally relates to wireless power transfer using resonantly coupled transmitter coils and receiver coils.

The transmitter 102 includes a power source 108 (e.g., a battery, a DC output of a power supply powered by utility power, a photovoltaic power source, etc), driving circuitry 110, a transmitter controller 111, and a plurality of transmit coils 112. In some examples, for each transmit coil 112, the driving circuitry 110 includes a drive circuit 125. The drive circuits 125 operate at a common frequency, but in general have controlled phase and voltage magnitude that is different for each transmit coil, with the phases and/or voltages being determined according to factors including the circuit characteristics of the receiver(s), the power requirements of the receiver(s), and the relative location and orientation (pose) of the receiver(s) relative to the transmitter. In some examples, without limitation, the transmitter 102 is included in a wireless charging base station such as an under-desk wireless charging base station, an on-top-of desk wireless base station, or integrated in another item such as in an computer monitor, television, appliance (e.g., in a lamp), furniture (e.g., in a chair), in a seat of a car, bus, train, or airplane.

The receiver 104 includes a receiver coil 120, receiver circuitry 114, a receiver controller 116. The receiver circuit 114 is represented as a receiver coupling circuit and a load to be powered, here illustrated as a load impedance 118, $Z_L$. In some examples, the receiver 104 is included in a battery powered electronic device such as a cellular telephone, a laptop computer, or a tablet computer, and the load represents a charging mechanism of the receiver's battery.

A particular magnetic coupling, or "mutual inductance", (a real number, for example, expressed in units of henrys, or equivalently volt-seconds per ampere), exists between any pair of coils, for example, between the receiver coil 120 in FIG. 1 and each of the transmitter coils 112. For example, a first mutual inductance $M_1$ exists between a first transmit coil and the receiver coil. A second mutual inductance $M_2$ exists between a second transmit coil and the receiver coil. A different magnetic coupling also exists between each pair of transmit coils 112. For example, a mutual inductance $M_{S12}$ (not illustrated) exists between the first transmit coil and the second transmit coil. Of course, when there are N transmit coils and a single receive coil, there are $N(N-1)/2$ mutual inductances between the transmit coils and N mutual inductances between the transmit coils and the receive coil in the system 100 shown in FIG. 1.

Some factors that may affect the magnetic coupling between two coils include the distance between the two coils, the shape of the coils (e.g., diameter of a circular coil), a ratio of a number of turns in the two coils, a permeability of the space between the two coils, the presence of other coils in proximity to the two coils, and an orientation of the two coils relative to one another.

Each transmit coil 112 in the system 100 is associated with its corresponding transmit coil circuit 115, the transmit coil circuit 115 driven by the drive circuit 125 for that coil, and the coil itself having a combined overall impedance at the driving frequency. At the $i^{th}$ transmit coil, this impedance is represented as an inductance $L_{Si}$ in series with a capacitance $C_{Si}$ which at the at the drive frequency $\omega_T$ satisfies $j\omega_T L_{Si}+1/j\omega_T C_{Si}=0$ (i.e., $L_{Si}C_{Si}=1/\omega_T^2$), in series with an impedance $Z_{Si}$, which effectively represents the entire impedance at the drive frequency $\omega_T$ driven by the drive circuitry. Similarly, the overall loop impedance associated with the receiver coil is denoted $Z_L$. These impedances are represented as complex numbers (in units of ohms, or equivalently volts per ampere), and are frequency dependent. Unless otherwise indicated, we consider the impedances at the frequency $\omega_T$ at which the transmitter operates (e.g., a frequency in a range of 100 kHz to 50 MHz). In general, the transmit and receive loops are tuned to the operating frequency at which $Z(\omega_T)$ is very small and generally substantially real.

In some embodiments, the system 100 includes a communications channel 122 over which the receiver controller 116 reports information from the receiver that is used by a transmit controller 111 to adjust the drive of the transmit coils, priority of different receivers, etc. However, as described below, such a channel is not essential to the operation of the adaptive procedure.

In general, the transmitter controller 111 senses the drive currents $I_{Si}$ through the coils, for example, using a sensing circuit (not shown in FIG. 1), which may be inductively coupled to the conductor passing the drive current, or may be sensed using a series resistor, and provides the phase and magnitude controls for each of the drive circuits 125. U.S. application Ser. No. 14/502,191, titled "WIRELESS POWER TRANSFER," includes description of at least some embodiments in which the transmitter controller 111 operates in a power transmission mode, in which it controls the drive of each transmitter coil to achieve efficient power transfer, or in an estimation mode, in which it determines estimates of certain mutual inductances between coils, for instance an estimate of the mutual inductances $M_i$ between each of the transmit coils 112 and the receiver coil 120.

The description below focuses on one or more embodiments in which the controller 111 maintains optimal or close to optimal power transmission efficiency while adapting the drive of the transmission coils to changing mutual inductance between the transmit coils 112 and one or more receiver coils 120 and/or between receiver coils 120 if there are multiple.

In one aspect of one or more of these embodiments, coupling between transmitting coils (represented as $M_{Sij}$ for the coupling between transmitting coils i and j 112) is determined by using diverse driving inputs (e.g., different sets of driving voltage amplitude at a number of different time intervals) and sensing the resulting responses (e.g., voltage and/or currents) in the transmitting coils in a first phase when there is no receiver present (or at least when no receiver coil is coupled to the transmitter coils to a significant degree, for example, because of a sufficient distance of the receiver coil from the transmitting coils, for because current in the receiver coil is interrupted, for example, with a switch in the receiver circuit). A second aspect, independent of the first aspect, makes use of knowledge of the inter-transmitting coil coupling, and also makes use of diversity of transmitting inputs and sensed responses to determine the coupling between each of the transmitting coils and a receiver coil coupled to the transmitting coils.

Figure 2:
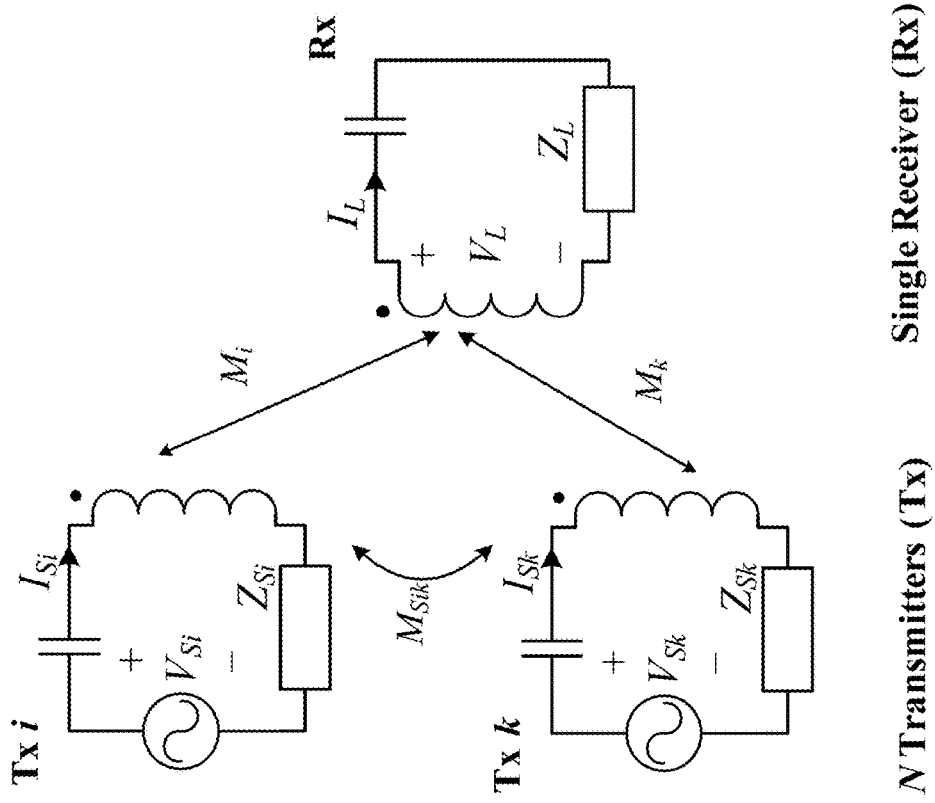
FIG. 2 is a schematic showing two transmitter coils and one receiver coil.

Without loss of generality, the description first focuses on a single receiver. Following FIG. 2, a relationship between currents at the receivers ("load current" $I_L$) and the currents at the transmitters ("source currents" $I_{Si}$ for the $i^{th}$ source) satisfy $$I_L Z_L = \sum_i j\omega M_i I_{Si}$$

and the voltages at the at the transmit coils satisfy $$V_{Si} = I_{Si} Z_{Si} + \sum_{k \neq i} j\omega M_{Sik} I_{Sk} - j\omega M_i I_L =$$

$$I_{Si} Z_{Si} + \sum_{k \neq i} j\omega M_{Sik} I_{Sk} + \frac{\omega^2}{Z_L} \sum_k M_i M_k I_{Sk}$$

which can be written in matrix form as $$V_S = XI_S - j\omega I_L M = \left(X + \frac{\omega^2}{Z_L}MM^T\right)I_S$$

where $$V_S = \begin{bmatrix} V_{S1} \\ V_{S2} \\ \vdots \\ V_{SN} \end{bmatrix}, I_S = \begin{bmatrix} I_{S1} \\ I_{S2} \\ \vdots \\ I_{SN} \end{bmatrix}, M = \begin{bmatrix} M_1 \\ M_2 \\ \vdots \\ M_N \end{bmatrix},$$

$$X = \begin{bmatrix} Z_{S1} & j\omega M_{S12} & \cdots & j\omega M_{S1N} \\ j\omega M_{S21} & Z_{S2} & \cdots & j\omega M_{S2N} \\ \vdots & \vdots & \ddots & \vdots \\ j\omega M_{SN1} & j\omega M_{SN2} & \cdots & Z_{SN} \end{bmatrix}$$

For convenience, we define $$Y = X + \frac{\omega^2}{Z_L}MM^T$$

as the coefficient matrix between the voltages and the currents, i.e., $V_S = YI_S$.

One approach to maximize the power received by the receiver is to set the transmitter current $I_S$ such that $$I'_S = CM$$

where $M = [M_1, M_2, \ldots, M_N]$ is the vector characterizing the magnetic channels (i.e., mutual inductances) between the transmit coils and receive coils, and C' is a complex scalar whose value depends on the power budget. Since this rule of setting the currents proportional to the channels matches with Maximal-Ratio Combining rule in conventional MIMO beamforming system, we call it "magnetic-beamforming," without necessarily implying the existence of a magnetic "beam" or the selection of a direction for such a beam.

In order to conduct magnetic-beamforming, two sets of information are used. First, the magnetic channels (i.e., M) are used to determine the optimal current $I'_S$. Second, the coefficient matrix Y is used. In some implementations, it may be difficult to apply the currents directly, for example, using a current source. Instead, in at least some embodiments, voltage sources are used and the system applies voltages $V_S' = YI_S'$. Consequently, Y is needed to transform currents to voltages.

One way to estimate both M and Y is to measure the magnetic channel between a particular transmitter and the receiver. To do this, the system turns on this transmitter to transmit power while turning off all the other transmitters. The system can then iterate among all transmitters. However, this approach has two major drawbacks in some implementations.

Iterating among all the transmitters can introduce significant overhead to power delivery. In order to estimate the channel, the beamforming effectively stopped, which generally reduces the power delivered to the receiver dramatically. This interruption to power delivery has to be done very frequently since the receiver might move at any time thus the channel might be constantly changing. As a result, it significantly reduces the power delivering efficiency.

Iterating among the transmitters can also complicate circuit design and creates a vulnerability in the circuit. In order to turn off a transmitter, one way is to use an electronically-controlled switch which can cut off the current. For a circuit with high quality factor coils, cutting off the current can impose a significant voltage across the inductor since the change of current is abrupt. This will possibly damage the circuit.

In an alternative approach, there is no need to have an interruptive channel estimation phase at all. Instead, the system keeps beamforming without interruption. The key parameters, M and Y, are inferred and updated by monitoring the changes of voltages and currents on an ongoing basis. By doing this, the system can smoothly track the magnetic channels and iteratively steer the beam towards a moving receiver.

Estimation of the magnetic channel M and the coefficient matrix Y between voltages and currents uses the equation $$V_S = XI_S - j\omega I_L M$$

The term $V_S$ in this equation represents the set of voltages (i.e., the complex representation of the magnitudes and phases) that is applied to the transmitter coils, so the system can directly measure $V_S$ in this equation. The system can also measure the currents of the transmitter coils $I_S$. The term X does not depend on the receiver, since it only contains the equivalent impedances of the transmitter circuits and the mutual inductances between different transmitter coils. In many implementations, the transmitter coils and circuit boards are hard-coded and are unlikely to change, X remains constant and can be pre-calibrated during manufacturing (the pre-calibration method is described below). Therefore, the system can compute the vector M as:

$$M = C(V_S - XI_S) = CM_0$$

where C is a scalar that $$C = \frac{1}{j\omega I_L}.$$

Using this equation, the system can always infer the channel M up to a complex scalar, regardless of what voltages and currents are applied to the transmitters. In particular, say that the system is beamforming to a specific receiver location, the system can use the applied voltages $V_S$ and measured currents $I_S$ to infer the new channel M up to a complex scalar that reflects possible changes in the receiver location.

Knowing M up to a complex scalar is sufficient to beamform. This can be seen from the equation for the beamforming currents that are needed:

$$I'_S = C'M = C''M_0$$

Since the beamforming current $I'_S$ is proportional to M up to a complex scalar, knowing M up to a complex scalar is enough. The appropriate C'' is selected in the way that the total power matches with the power budget.

Once the system has computed the desired currents $I'_S$, the system determines Y so that it can apply $V_S' = YI_S'$. Recall that $$Y = X + \frac{\omega^2}{Z_L}MM^T.$$

Since the system has already estimated $M = C(V_S - XI_S) = CM_0$, substituting this estimate into the above equation yields:

$$V_S = \left(X + \frac{\omega^2}{Z_L} MM^T\right)I_S = \left(X + \frac{\omega^2 C^2}{Z_L} M_0 M_0^T\right)I_S = (X + C_1 M_0 M_0^T)I_S$$

In this equation, the system knows or has estimated the terms $V_S$, $I_S$, $X$, $M_0$, the only unknown variable is the complex scalar $C_1$. The system can solve for $C_1$ by:

$$C_1 = \frac{1}{M_0^T I_S} = \frac{1}{(V_S - XI_S)^T I_S}.$$

Note that both $M_0$ and $I_S$ are vectors so $M_0^T I_S$ is the dot product between the two vectors. Consequently, $$Y = \left(X + \frac{M_0 M_0^T}{M_0^T I_S}\right),$$

where $$M_0 = V_S - XI_S.$$

The approach described above can therefore iteratively track the receiver and steer the beam: the system infers the magnetic channel and the coefficient matrix passively by measuring the currents in the transmitter coils, and uses this inferred information to update the beam. This process of passively estimating the channel and updating the beam is iterated repeatedly, so that the system can track a moving receiver.

To initialize this iteration, the system detects when a receiver comes into range, initializes the beam, and begins the iteration. This initialization proceeds as follows.

When there is no receiver in the vicinity of the transmitter, the system is in a detection state. While in this state, the system tries to detect a receiver using an approach that is termed herein "diagonalizing the current", which is expanded upon later in this description. Once receiver comes into the vicinity of the transmitter, its presence imposes changes in the currents, which are detected by the system. These changes are used to infer the magnetic channels, effectively in the same manner as during the iterative approach described above, and then the iteration it started.

When there is no receiver in the vicinity of the transmitter, the system cannot be totally idle since a receiver can come in at any time and needs to be detected. Instead, the system wakes up the transmitter coils in turn (e.g., immediately one after another, or with delays) to detect possible receiver devices. When a receiver comes into range, at least the nearest transmitter should be able to detect the receiver when awakened. Although such an iteration between transmitter coils is not required, doing so minimizes power dissipation while no receiver is in the vicinity of the transmitter and maintains high sensitivity to a possible receivers.

One way to implement this detection procedure is as a round-robin using electrically-controlled switches in series with the transmitter coils which are normally open and closed successively. However, as pointed out earlier, opening such a switch can interrupt the current in a coil, and impose possible damages to a high-Q high-power resonating circuit, and complicate the circuit design.

Instead, in another way to implement the detection procedure, the system zeroes out the current $I_{Si}$ in any given transmitter coil i by carefully applying a particular set of voltages to the set of transmit coils. The intuition is that if the system drives a transmit coil with the voltage that exactly opposes the total induced voltage from all of the other transmit coils, the system zeroes-out the current in this coil.

This process of applying voltages to zero the currents in the transmit coils is referred to as "diagonalizing the current" because of the following formulation in matrix form. If the system repeatedly issues different sets of voltages for N times, the resulting currents satisfy $$[V_S^{(1)} V_S^{(2)} \ldots V_S^{(N)}] = X[I_S^{(1)} I_S^{(2)} \ldots I_S^{(N)}]$$

Note that the system has the freedom to choose the voltage matrix. If the system sets the sequence of sets of driving voltages (magnitudes and phases) to $$[V_S^{(1)} V_S^{(2)} \ldots V_S^{(N)}] = X$$

(or proportional to these values) it effectively diagonalize the current matrix $[I_S^{(1)} I_S^{(2)} \ldots I_S^{(N)}]$ so that for each set of driving voltages in the sequence only one coil has nonzero (e.g., unit) current and all of the other coils have zero currents.

When a receiver comes into the vicinity of the transmitter, it can be immediately detected since now $V_S = XI_S$ no longer holds. Moreover, the difference $M_0 = V_S - XI_S$ is used to infer the magnetic channel and the coefficient matrix, by the same method described above. The system can then beamform the magnetic field and the algorithm will steadily update.

The pseudo-code for "Procedure 1" in the Appendix corresponds to the initialization and iteration approach presented above. This procedure assumes that the system knows the matrix X a priori. The matrix X only contains information about the transmitter (i.e., the equivalent impedance of a single transmitter, and the mutual inductances between any pair of transmitters). After the transmitter coils are manufactured and their relative positions are fixed, X will remain stable. Consequently, the system can use a pre-calibration step to calibrate X once and then use the calibrated value throughout the iterative procedure.

In some examples, the pre-calibration is done at the manufacturing of the transmitter. Alternatively, the pre-calibration may be performed after deployment. In any case, this pre-calibration is performed when it is known that there are no receivers in the vicinity of the transmitter. Because there are no receivers in the vicinity, the relationship between transmitter coil voltages and currents simplifies to $$V_S = XI_S$$

The system (or equivalent calibration system) repeatedly drives voltages ($V_S$) to the transmitter coils for $P(P \leq N)$ times, where N is the number of transmit coils) times, while each time applying different set of voltages. Thus, the P transmitter voltages and currents are related as $$[V_S^{(1)} V_S^{(2)} \ldots V_S^{(P)}] = X[I_S^{(1)} I_S^{(2)} \ldots I_S^{(P)}]$$

and the matrix X can be solved as $$X = [V_S^{(1)} V_S^{(2)} \ldots V_S^{(P)}][I_S^{(1)} I_S^{(2)} \ldots I_S^{(P)}]^\dagger$$

where $\dagger$ is the pseudo-inverse operator. In the above equation, the voltages are known (since they are the applied voltages) and the currents can be measured at the transmitter.

The discussion above focuses on a single receiver situation. The discussion below extends the approach to the scenario where there are one or more receivers in the vicinity of the transmitter. These receivers can be either the same type of electronic device or different types. For example, a user can charge her two iPhones, or she can charge her iPhone and her iPad at the same time, or charge a device and power a lamp at the same time.

Unlike MIMO (Multi-Input/Multi-Output) techniques for radio frequency (RF) communication in which each receiver is a passive listener that only receives power, each receiver in the magnetic MIMO system is both a receiver and a transmitter. This is because a receiver coil not only accepts power, but also "reflects" the power to both the transmitters and the other receivers. Therefore, changing (e.g., adding, removing or moving) just a single receiver in the system will affect the power input and output of all of the other coils, including both transmitters and receivers. This has two effects: 1) The solution to achieve the optimal power delivery is not the same as it is in the MIMO RF system; 2) In order to maximize the power delivered to the receivers, the system would have to know each channel, not only between transmitters and receivers, but also between any pair of receivers.

Therefore, in order to maximize the delivered power to the receivers, it seems that this non-linear increase of complexity due to multiple receivers might suggest the necessity of some complicated algorithm with significant overhead to estimate the magnetic channel between every transmitter and receiver and every pair of receivers. However, a procedure is described below that is: 1) both theoretically and empirically proven to maximize the power delivered to the receivers and 2) with zero overhead. The zero overhead property eliminates the need for handshakes or any kind of explicit communication between transmitters and receivers, as well as explicit channel estimation phases as in any conventional multi-user MIMO system. Specifically, in these embodiments, the transmitter can infer and track the existence of one or more receivers and their magnetic channels totally passively, without any interruption to the optimal power delivery. Note that communication with the receiver is not precluded, but is not necessary.

There are two important observations underlying the procedure. The first observation comes from the fact that a receiver reflects its received power proportionally. Thus by monitoring the amount of power that gets reflected back to the transmitter we can infer the channel between transmitter and receiver, without having to communicate between transmitter and receiver.

The second observation is needed to address the issue that the reflected power from each of the receivers combines at the transmitter, so it becomes difficult to disentangle the channels without knowingly turning off all the other transmitters and receivers. The key observation, which we call the theorem of channel estimation (proven below), states that the combined reflected power from the receivers are sufficient to calculate the optimal currents that maximize the power delivery. In other words, we do not need to disentangle the reflected power or measure every single channel to do magnetic MIMO.

Based on these two observations, the final procedure works in an iterative way. The controller constantly monitors currents $I_{Si}$ of the transmit coils, as well as (optionally) the achieved drive voltage $V_{Si}$ at the output of the drive circuits 125. Monitoring the achieved drive voltage can address imprecision in setting the voltages, however such monitoring may not be necessary the achieved voltage is accurately controlled. When any of the drive voltages or currents change, this indicates to the controller that there have been changes in the magnetic channels, which for example can be caused by one or more of the receivers leaving, arriving, or moving, or a load impedance at a receiver changing. The procedure updates its estimation accordingly, and re-calculates the optimal currents that maximize the power delivery.

The system applies these updates to the drive circuits for the transmit coils and iterate again.

The zero-overhead algorithm enables the system to deliver the optimal amount of power to multiple receivers. Specifically, it achieves the following:

Optimal Performance.

The system maximizes power delivery for any given channel state. In addition, it constantly delivers optimal power along the time, since it does not need to interrupt power delivery to do channel estimation by passively inferring the channel while delivering optimal power.

Simplicity.

The design of both the transmitter and the receiver is simple, which enables low-cost implementation of the whole system. 1) The core procedure running on the transmitter is very simple; 2) Without the need to implement any communication or computation on the receiver, it allows miniaturizing the receiver circuitry to be embedded in a thin iPhone or iPad case that simply attaches to the device.

Robustness.

The procedure is robust to errors and noise. As shown below, the algorithm has a self-correcting property that causes the system to converge quickly to the optimal power delivery even with a large error in estimation. Specifically, the error will be automatically corrected in a number of iterations that is less than the number of transmitters.

Fairness.

The procedure not only delivers maximal total power, but also distributes the power fairly among receivers. It inherently gives priority to low battery-level devices over high battery level devices. This means devices with different initial battery levels will finish charging at roughly the same time.

The details of the procedure, as well as key theorems and proofs will be explained below. Generally, this discussion answers the following two questions:

If we have all of the channel information, what is the optimal solution that maximizes the received power?

How do we practically obtain enough information to enable us to calculate and apply the optimal solution?

Figure 3:
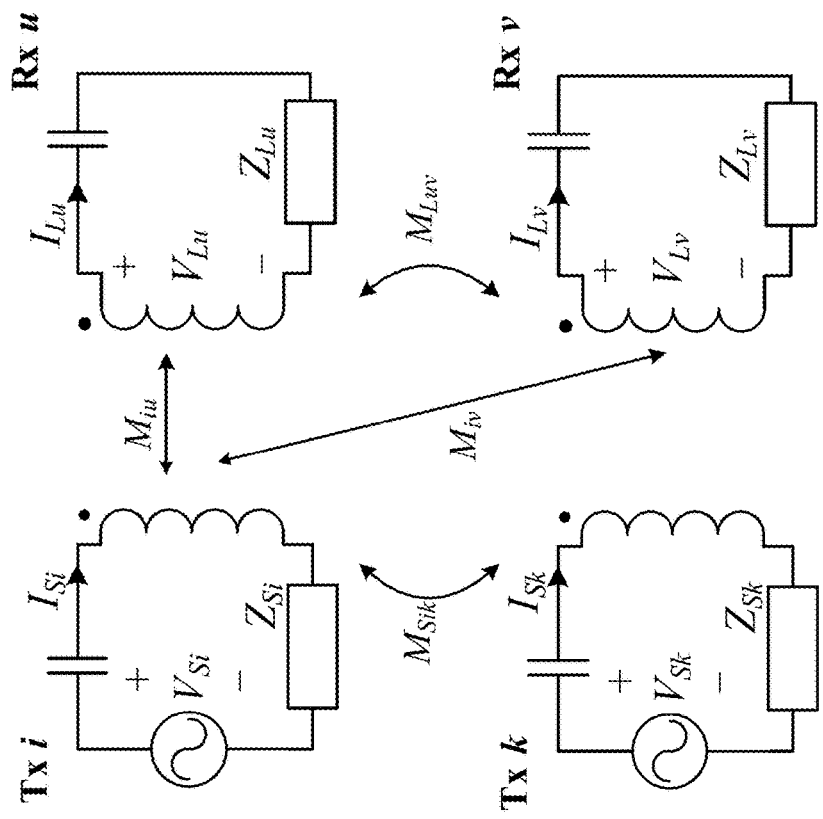
FIG. 3 is a schematic showing two transmitter coils and two receiver coils.

We consider the scenario in the following figure where we have N transmitters (Tx) and M receivers (Rx), as illustrated in FIG. 3.

The constraints on the voltages and currents are:

$$I_{Lu}Z_{Lu} = \sum_i j\omega M_{iu} I_{Si} - \sum_{v \neq u} j\omega M_{Luv} I_{Lv}$$

$$V_{Si} = I_{Si} Z_{Si} + \sum_{k \neq i} j\omega M_{Sik} I_{Sk} - \sum_u j\omega M_{iu} I_{Lu}$$

and its corresponding matrix form:

$$X_L I_L = j\omega M^T I_S$$

$$V_S = X_S I_S - j\omega M I_L = (X_S + \omega^2 M X_L^{-1} M^T) I_S$$

where $$V_S = \begin{bmatrix} V_{S1} \\ V_{S2} \\ \vdots \\ V_{SN} \end{bmatrix},$$

-continued $$I_S = \begin{bmatrix} I_{S1} \\ I_{S2} \\ \vdots \\ I_{SN} \end{bmatrix},$$

$$I_L = \begin{bmatrix} I_{L1} \\ I_{L2} \\ \vdots \\ I_{LM} \end{bmatrix},$$

$$M = \begin{bmatrix} M_{11} & M_{12} & \cdots & M_{1M} \\ M_{21} & M_{22} & \cdots & M_{2M} \\ \vdots & \vdots & \ddots & \vdots \\ M_{N1} & M_{N2} & \cdots & M_{NM} \end{bmatrix}$$

$$X_S = \begin{bmatrix} Z_{S1} & j\omega M_{S12} & \cdots & j\omega M_{S1N} \\ j\omega M_{S21} & Z_{S2} & \cdots & j\omega M_{S2N} \\ \vdots & \vdots & \ddots & \vdots \\ j\omega M_{SN1} & j\omega M_{SN2} & \cdots & Z_{SN} \end{bmatrix},$$

$$X_L = \begin{bmatrix} Z_{L1} & j\omega M_{L12} & \cdots & j\omega M_{L1M} \\ j\omega M_{L21} & Z_{L2} & \cdots & j\omega M_{L2M} \\ \vdots & \vdots & \ddots & \vdots \\ j\omega M_{LM1} & j\omega M_{LM2} & \cdots & Z_{LM} \end{bmatrix}$$

By analogy of system to a conventional MIMO RF system y=Hx, where x and y are the transmitted and received signal, and H is the channel matrix, the current $I_L$ is analogous to the received signal (y) while $I_S$ is analogous to the transmitted signal (x). In the analogy, the channel matrix is $$H = j\omega X_L^{-1} M^T$$

such that $$I_L = j\omega X_L^{-1} M^T I_S$$

Note that the formulation of the channel matrix H in magnetic-MIMO is different from the channel matrix in MIMO, particularly because we have an extra term $X_L^{-1}$, which captures the impedances of receivers and the coupling between the receivers.

Given this analogy, to maximize the received power in a conventional MIMO system, the following can be concluded.

Theorem 1:

For a MIMO system y=Hx, if the transmitted power $\|x\|_2^2$ is fixed to P, then the signal x that maximizes the received power $\|y\|_2^2$ is proportional to the eigenvector of H*H that has the maximum eigenvalue.

Proof:

Assume the Singular Value Decomposition (SVD) of H is H=UΣV*, then y=UΣV*x, and $$\|y\|_2^2 = U^*, \|y\|_2^2 = \Sigma V^*, \|x\|_2^2 = \Sigma \|x\|_2^2, \text{ wherein } x' = V^*x$$

Note that since V* is a unitary matrix, $\|x'\|_2^2 = \|x\|_2^2 = P$. Thus, the optimal x' is all zeros except on the entries corresponding to the maximal entry of Σ. Since x=Vx', the optimal x corresponds to the column of V that corresponds to the largest entry of Σ·□

For the simplicity of presentations, we define the following short-hand denotation:

$$x = \text{maxeig}(H^*H)$$

where maxeig(•) is a denotation we use throughout this document representing the eigenvector of a matrix corresponding to the maximal eigenvalue.

The conclusion in Theorem 1, with appropriate modifications, can be applied to a magnetic-MIMO system. The modification relates to the fact that the receivers might be different electronic devices or the same type of device but with different battery levels, so their equivalent impedances can be very different from each other. When we calculate the received power, it is not simply $\Sigma_u \|I_{Lu}\|_2^2$, but $\Sigma_u R_{Lu} \|I_{Lu}\|_2^2$ where $R_{Lu}$ is the resistance of load u (or more precisely, the real component of the equivalent impedance $Z_L$ of the whole receiver circuit). The same heterogeneity might occur on the transmitters as well, since we do allow different sizes of transmitter coils in the design. Taking care of these heterogeneities in both the transmitters and receivers leads to the extra $R_S$ and $R_L$ terms in the following Theorem 2.

Theorem 2:

Given a fixed power budget P, the optimal $I_S$ that maximizes the total power received by all of the receivers is proportional to $$\sqrt{R_S^{-1}} \text{maxeign}(\sqrt{R_S^{-1}} H^* R_L H \sqrt{R_S^{-1}}),$$

where $H = j\omega X_L^{-1} M^T$,
$R_S = \text{Re}(\text{diag}(Z_{S1}, Z_{S2}, \ldots, Z_{SN}))$ and
$R_L = \text{Re}(\text{diag}(Z_{L1}, Z_{L2}, \ldots, Z_{LM}))$.

Proof:

Expanding equations presented above, the total power dissipated in the transmitter is $P_S = I^*_S R_S I_S$. The total power dissipated in the receivers is $P_L = I^*_L R_L I_L = (HI_S)^* R_L (HI_S)$. Therefore, optimizing the total power can be formulated as follows $$\max I_L^* R_L I_L$$

$$\text{s.t. } I^*_S R_S I_S + I^*_L R_L I_L = P$$

$$I_L = HI_S$$

Defining $x = \sqrt{R_S} I_S$, $y = \sqrt{R_L} I_L$, and $H' = \sqrt{R_L} H \sqrt{R_S^{-1}}$, then the optimization problem is reduced to:

$$\max \|y\|_2^2$$

$$\text{s.t. } \|x\|_2^2 + \|y\|_2^2 = P$$

$$y = H'x$$

This form of the optimization problem is similar formulation to that in Theorem 1. By a similar proof, we can show that the optimal x corresponds to the eigenvector of matrix (H')*H' with the maximal eigenvalue.

For the sake of simplicity, we assume that the transmitter coils are identical, i.e., $Z_{S1} = Z_{S2} = \ldots = Z_{SN}$ Note that this assumption does not change any of the conclusions but only make the equations simpler to follow. In this case, $R_S$ is proportional to the identity matrix and the conclusion in Theorem 2 reduces to $$I'_S \propto \text{maxeig}(H^* R_L H), \text{ where } H = X_L^{-1} M^T:$$

The discussion above provides an optimal solution to the selection of driving voltages (and phases) that maximizes the total power delivered to the receivers. The discussion below addresses how this selection of driving voltages distributes power among the multiple receivers. What is shown below is that, although the formulation provided above does not explicitly address fairness among the receivers, the solution is indeed fair.

Fairness is a very important criterion for wireless power delivery to multiple devices. For example, delivering an equal amount of power to each receiver is not always the right solution: if the user has an iPhone with a full battery and a second dead iPhone, a natural approach is to focus the power on the dead phone; if one has two different devices, e.g., iPad and iPhone, they might require different amounts of energy to be fully charged. In both cases, delivering equal power to the two receivers is not optimal from the user's perspective.

Figure 4:
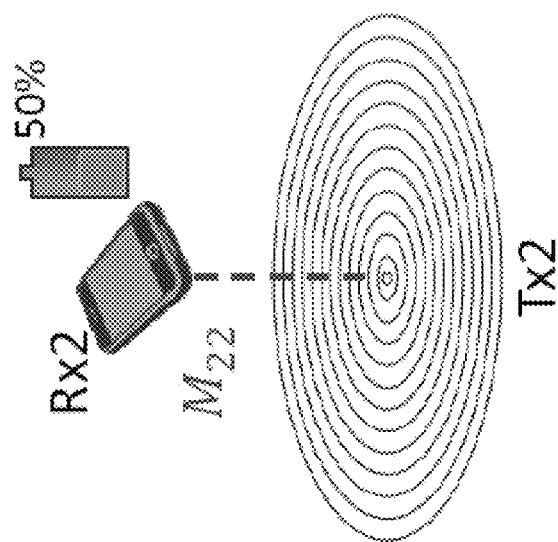
FIG. 4 is a diagram showing two transmitter coils and two receiver coils in which the receiver coils are each relatively close to a single transmitter coil.
Figure 4:
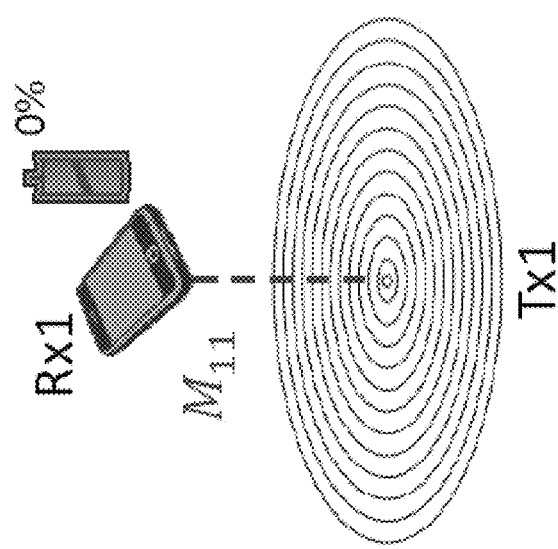

Referring to FIG. 4, consider the scenario with two identical transmitters with two receivers equally near to each transmitter while very far away from each other. Effectively, this leads to $M_{11}=M_{22}=M_0$, $M_{12}\approx 0$, and $M_{21}\approx 0$. Moreover, let's assume that the receiver is well-tuned such that the equivalent impedances are purely real, i.e., $Z_{L1}=R_{L1}$, $Z_{L2}=R_{L2}$. However, the two receivers have different battery levels, e.g., Rx1 has a dead battery while Rx2 has a 50% battery.

The optimal solution given by Theorem 2 that maximizes the total power received is:

$$H^* R_L H = \omega^2 M_0^2 \begin{bmatrix} \frac{1}{R_{L1}} & 0 \\ 0 & \frac{1}{R_{L2}} \end{bmatrix}$$

This solution has two eigenvalues, $$\frac{1}{R_{L1}} \text{ and } \frac{1}{R_{L2}},$$

and the corresponding eigenvectors are $[1\ 0]^T$ and $[0\ 1]^T$. By Theorem 2, the optimal solution is the eigenvector associated with the largest eigenvalue, i.e., in this case, the optimal solution is to always charge the receiver with lower equivalent load resistance. Note that in receivers that limit the amount of power consumed, for example, by increasing the equivalent resistance when the available power exceeds the desired power, the equivalent load resistance would increase, thereby resulting in other receivers being provided power when their resistance is exceeded.

Understanding why powering the receiver with the lower equivalent receiver is fair in the case of the charging devices can be understood by considering how the equivalent resistance is related to a degree of charge of a typical battery. Common personal electronic devices (e.g., iPhone, iPad, etc) use lithium batteries, whose impedance can be written as $$R_{eq} = \frac{(V_{in})^2}{P_{in}}.$$

Note that is somewhat of a simplification of a situation in which a charging circuit may implement a constant-current/constant-voltage charging approach in which case the equivalent resistance will vary during the charging cycle. The iterative approach described above will nevertheless adapt to the varying equivalent resistance. In a simplified case, during the charging process, $V_{in}$ is roughly constant while $P_{in}$ changes with battery level. When the battery level is low, $P_{in}$ is big in order to quickly charge the battery; when the battery level is high, $P_{in}$ gradually reduces to nearly zero until the phone is fully charged. Therefore, the equivalent resistance grows with the charge level.

This relationship between load resistance and battery level interacts well with the selection of optimal driving voltages as described above. Referring again to FIG. 4, recall that the optimal solution is to charge the receiver with lower effective resistance, which corresponds to charging the receiver with the lowest charged battery. When the system starts, it focuses on delivering power to the receiver Rx1, which has the lowest charge since it has lower resistance. Once that receiver's battery reaches the same level as Rx2 (in this example, 50%), its equivalent resistance will be similar to that of the other receiver. Afterwards the system effectively splits power between receivers Rx1 and Rx2, charging them effectively at the same rate until they are fully charged. Therefore, the system achieves fairness by granting priority to the one with smaller battery level.

This fairness property can be generalized to other scenarios. Generally, the distribution of power to different receivers is weighted by their corresponding load impedances (which are typically purely resistive). Moreover, as explained above, the load impedance of a receiver device gradually goes up with the charge level. This inherently means the device with a low battery level receives a greater share of the power distribution and consequently drains more power and charges more quickly. At the same time, the device with a high battery level gets less power and will "wait" for the laggards to catch up, i.e., the devices with lower battery levels. Finally they are charged to full battery head-to-head, as their impedances also go asymptotically to almost infinity.

As introduced above, in general every receiver in the system also works as a transmitter since it "reflects" the power. In some scenarios, a particular receiver can extend the range of the transmitters by relaying the power to another receiver. We call this receiver a "repeater". In the following example, we will show how the solution in Theorem 2 works in a repeater scenario.

In general, in at least some embodiments, the receivers react to changes in power transfer more slowly that the reaction time of the transmitter adapting to changes in the magnetic coupling. In this scenario, stability of the overall system is observed in practice.

Figure 5:
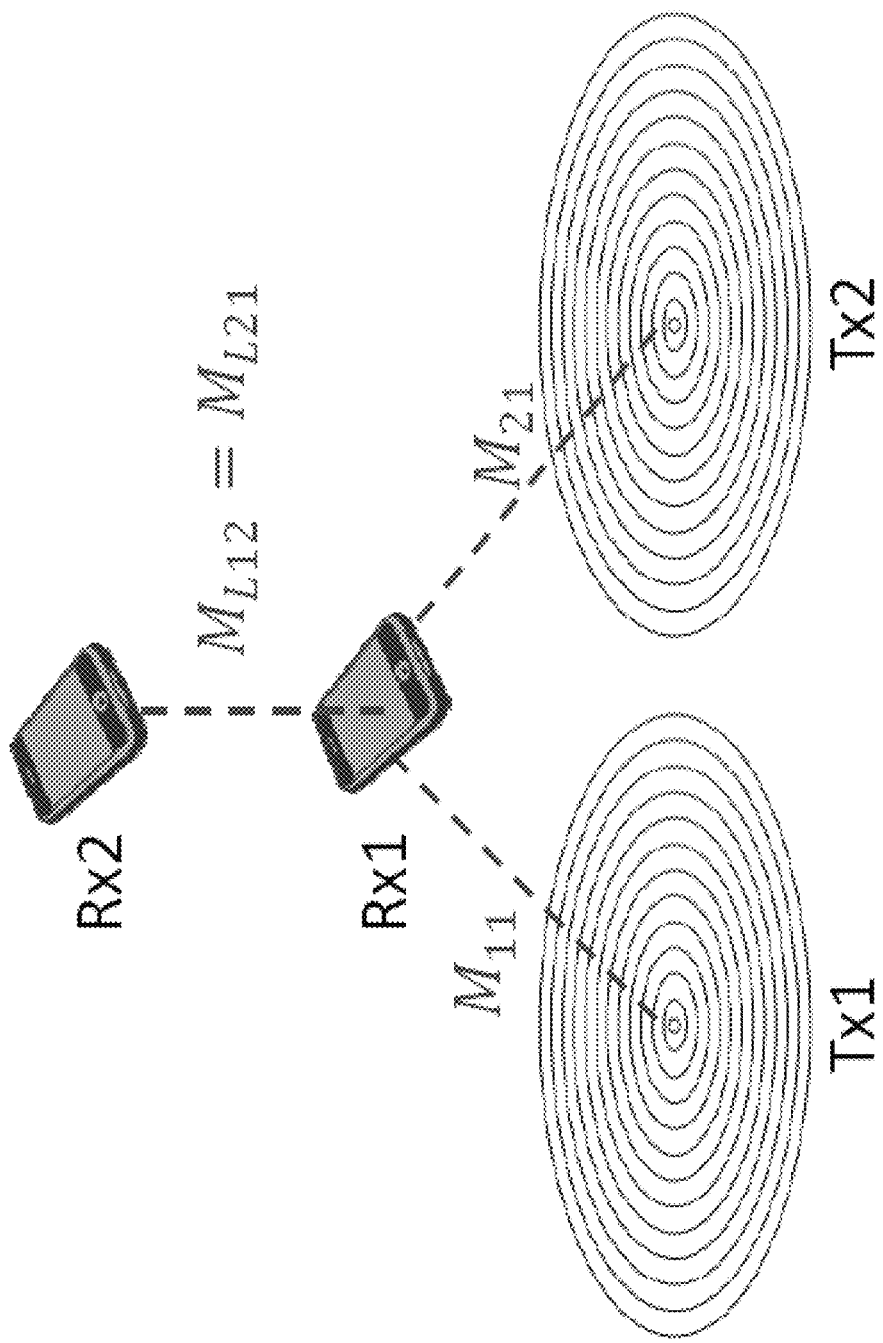
FIG. 5 is a diagram showing two transmitter coils and two receiver coils in which a first receiver coil is reachable from the transmitters, and the other receiver coil is not reachable from the transmitters but reachable from the first receiver coil.

Referring to FIG. 5, the are two transmitter coils, and two receivers. One receiver Rx1 is reachable from both of the transmitter coils ($M_{11}\neq 0, M_{21}\neq 0$), but the other receiver Rx2 is far away from the transmitters that it gets very weak couplings ($M_{12}\approx M_{22}\approx 0$). However, Rx2 is coupled to Rx1 such that their coupling ($M_{L12}$) is not ignorable.

Applying Theorem 2 (and also assuming the receivers are well-tuned, i.e., $Z_{L1}=R_{L1}, Z_{L2}=R_{L2}$) we get:

$$H^* R_L H = \frac{\omega^2 R_{L2}}{R_{L1}R_{L2} + \omega^2 M_{L12}^2} \begin{bmatrix} M_{11}^2 & M_{11}M_{21} \\ M_{11}M_{21} & M_{21}^2 \end{bmatrix}$$

This matrix has only has one non-zero eigenvalue whose eigenvector is $[M_{11}\ M_{12}]^T$. This means the optimal current is $I_{S1}=C'M_{11}, I_{S2}=C'M_{21}$. This turns out to be exactly the beamforming solution when only Rx1 is around, i.e., we effectively focus the power to form a beam towards Rx1. Moreover, since we use Rx1 as a relay to deliver power to Rx2, maximizing power on Rx1 also maximizes power on Rx2. Specifically, the current on the Rx2 is $$I_{L2} = -\frac{j\omega M_{L12}}{R_{L2}} I_{L1}$$

which is proportional to the current on Rx1 ($I_{L1}$). Therefore, we maximize the power delivered to Rx2 by maximizing the power to Rx1 and using it as a repeater.

An alternative strategy for power transfer to multiple receivers is to use a round-robin approach in which each receiver is "targeted" in turn by maximizing the power transfer to that receiver. Such a strategy would generally make use of a communication channel from the receiver to the transmitter, while such a channel is not necessary in other strategies described above. Although there may be implementations when such an alternation is preferable for reasons other than maximizing overall power transfer, we show below that the optimal solution approach described above provides equivalent fairness.

For example, for a system with M receivers, a time-sharing solution is to form a beam to every single receiver in turns. At any given point in time, the system forms a beam to one specific receiver; along the time axis, the time resource is allocated to different receivers based on some explicit fairness objectives. For example, the allocation of time can be done so that all receivers will be fully charged at the same time.

Compared to the time-sharing alternative, the optimal solution approach described above is able to achieve the same fairness goal, i.e., getting all receivers fully charged at the same time, but much faster. The reasons are as follows. In the optimal solution approach, the system tries to deliver more power to less charged devices and will eventually charge all devices around the same time. At any point in time, according to Theorem 2, the system is delivering more power than any other setting of voltages and currents, particularly, the voltages and currents applied by the time-sharing system. Since our system constantly delivers more power and the total amount of energy needed to charge all devices is the same, we will eventually take less time to charge all devices.

In the previous sections, the optimal beamforming solution is described under the assumption that all of the channel information is known. However, to obtain this information we need to estimate the couplings between every pair of transmitter and receiver, as well as every pair of receivers. As shown above, this can introduce a substantial amount of overhead.

An alternative way to compute and apply the optimal solution given by Theorem 2 is presented below. Specifically, this alternative is based on determining 1) what is the minimal set of information needed to calculate the optimal solution, and then 2) providing a procedure to obtain this set of information.

Recall that the optimal beamforming solution is maxeig ($H^* R_L H$). Therefore, if there is a way to estimate $H^* R_L H$ as a whole, the system can then calculate its eigenvectors and eigenvalues. Although directly measuring $H^* R_L H$ might be hard, the following theorem, which we call the Theorem of Channel Estimation, provides a way to indirectly measure $H R_L H$ by setting up an equivalent relationship:

Theorem 3 (Theorem of Channel Estimation):

$H^* R_L H = \text{Re}[\omega^2 M X_L^{-1} M^T]$, where $\text{Re}[\cdot]$ takes the real part of a complex matrix.

Proof:
Note that the real part of matrix $X_L$ is $R_L$ (by the definition of $R_L$). Further, let's denote the real and imaginary part of $X_L$ and its inverse by:

$$X_L = R_L + jS_L, X_L^{-1} = P_L + jQ_L$$

Therefore, $$X_L X_L^{-1} = (R_L + jS_L)(P_L + jQ_L) = (R_L P_L - S_L Q_L) + j(S_L P_L + R_L Q_L) = I$$

$$X_L X_L^{-1} = (P_L + jQ_L)(R_L + jS_L) = (P_L R_L - Q_L S_L) + j(Q_L R_L + P_L S_L) = I$$

which leads to:

$$\begin{cases} R_L P_L - S_L Q_L = I & (*) \\ P_L R_L - Q_L S_L = I & (**) \\ S_L P_L + R_L Q_L = O & (\dagger) \\ Q_L R_L + P_L S_L = O & (\dagger\dagger) \end{cases}$$

On the other hand, $$H^* R_L H = \omega^2 M (X_L^{-1})^* R_L X_L^{-1} M^T$$

where, $$(X_L^{-1})^* R_L X_L^{-1} = (P_L + jQ_L)^* R_L (P_L + jQ_L)$$

Note that both $P_L$ and $Q_L$ are real symmetric matrices, therefore:

$$(X_L^{-1})^* R_L X_L^{-1} = (P_L - jQ_L) R_L (P_L + jQ_L) = (P_L R_L P_L + Q_L R_L Q_L) + j(P_L R_L Q_L - Q_L R_L P_L)$$

whose real part is:

$$P_L R_L P_L + Q_L R_L Q_L = P_L(I + S_L Q_L) + Q_L R_L Q_L \quad (\text{equation}^*)$$
$$= P_L + (P_L S_L + Q_L R_L)Q_L$$
$$= P_L \quad (\text{equation } \dagger\dagger)$$

and the imaginary part is:

$$P_L R_L Q_L - Q_L R_L P_L = P_L(O - S_L P_L) + (O - P_L S_L)P_L \quad (\text{equation } \dagger \text{ and } \dagger\dagger)$$
$$= O$$

So, $$H^* R_L H = \omega^2 M (X_L^{-1}) R_L X_L^{-1} M^T = \omega^2 M P_L M^T = \omega^2 M \, \mathbb{R} \, [X_L^{-1}] M^T$$

Note that M is a real matrix, so $\omega^2 M \mathbb{R} [X_L^{-1}] M^T = \mathbb{R} [\omega^2 M X_L^{-1} M^T]$. □

Theorem 3 reduces the problem of estimating $H^* R_L H$ to estimating matrix $A = \omega^2 M X_L^{-1} M^T$, which turns out to be an easier task. To see why, recall that $$V_S = (X_S + \omega^2 M X_L^{-1} M^T) I_S$$

or equivalently, $$V_S - X_S I_S = \omega^2 M X_L^{-1} M^T I_S = A I_S$$

The left hand side of this equation is known, since the system is constantly monitoring $V_S$ and $I_S$, and $X_S$ is known a priori by the pre-calibration step. The right hand side is the product of matrix A, which is the one we try to estimate, and vector $I_S$, which we know. Therefore, estimating matrix A is the problem of estimating the coefficient matrix in a linear system z=Ab where we can collect observations of z ($V_S-X_SI_S$ in our case) and b ($AI_S$ in our case). Specifically, one possible way to estimate A is as follows: apply N different sets of voltages $V_S^{(1)}, V_S^{(2)}, \ldots, V_S^{(N)}$ where N is the number of transmitters, and observe the corresponding currents $I_S^{(1)} \ldots, I_S^{(N)}$, so that $$A=[V_S^{(1)}-X_SI_S^{(1)}V_S^{(2)}-X_SI_S^{(2)} \ldots V_S^{(N)}-X_SI_S^{(N)}][I_S^{(1)} I_S^{(2)} \ldots I_S^{(N)}]^{-1}$$

This approach does estimate the matrix A, but in order to estimate one instance of A, it requires N different sets of voltages. This is not the ideal solution, because out of these N measurements, only one of them can be the optimal $V_S$ and $I_S$, while the other (N-1) different sets of voltages are suboptimal. Since A might be constantly changing and needs to be frequently estimated, it means a non-negligible amount of time needs to be spent on suboptimal power delivery. An ideal solution would be to estimate A using only the optimal solutions without having to use N different sets of voltages and currents, which will be discussed in below.

Above, the channel estimation problem is reduced to estimating $A=\omega^2 MX_L^{-1}M^T$. A remaining question, however, is what is the best way to estimate A. The intuition underlying of an alternative approach is that the system does not need to estimate A from scratch. Instead, the system uses an iterative algorithm to keep track of the changes of A. In each iteration, the system starts with the original estimation and focus on estimating $\Delta A$ which is the difference between the previous estimated A and the present A. A Procedure 2 provided in the Appendix outlines the updating process. Note that Procedure 2 starts in steady-state. Therefore, to bootstrap the whole process, the system can rely on the pre-knowledge of $X_S$, which is estimated by a pre-calibration process. The bootstrap and pre-calibration process are exactly the same to those in Procedure 1 when there is only at most one receiver around.

Procedure 2 is a best-effort algorithm in the sense that it always applies the optimal solution according to the most recently estimated A, which minimizes the time when the system delivers a suboptimal amount of power. A further discussion of Procedure 2, below, focuses on correctness, convergence and robustness.

Let us start with a simplified case that the coefficient matrix changes from $A_0$ to A, and then remains stable. We will prove that Procedure will converge to the right estimation. Let's define $A_i$ as the estimation at iteration i, and $\Delta A_i$ as the estimation error at iteration i, (i.e., $\Delta A_i=A-A_i$). The idea is that from iteration (i-1) to i, the rank of the estimation error will monotonically decrease, i.e., rank ($\Delta A_i$) ≤rank ($\Delta A_{i-1}$)-1. Since the rank of a matrix can be at most the size of the matrix, and the size of A is N (the number of transmitters), the algorithm will converge to A in at most N iterations. The rank-decreasing property is proven by Theorem 4.

Theorem 4:

For any matrix S of size n×n that is complex symmetric such that $S^T=S$, and any complex vector $\eta$ of size n×1 such that $\eta^TS\eta\neq 0$, $$\text{rank}\left(S - \frac{\xi\xi^T}{\xi^T\eta}\right) \leq \text{rank}(S) - 1$$

where $\xi=S\eta$.

Proof:
Define r=rank (S). Since S is a complex symmetric matrix, its Autonee-Takagi Factorization always exists (For a proof of the existence of the factorization, refer to Takagi, T. (1925), "On an algebraic problem related to an analytic theorem of Carathéodory and Fejér and on an allied theorem of Landau", *Japan. J. Math.* 1: 83-93). Therefore $$S = Q\Lambda Q^T,$$

where $$\Lambda = \begin{bmatrix} \Lambda_0 & O \\ O & O \end{bmatrix}$$

where Q is a n×n unitary matrix, $\Lambda_0$ is a r×r diagonal matrix, and the zero matrices O in the block matrix are of their appropriate sizes. By substituting S, we get:

$$S - \frac{\xi\xi^T}{\xi^T\eta} = S - \frac{S\eta\eta^TS^T}{\eta^TS^T\eta} = Q\left(\Lambda - \frac{\Lambda Q^T\eta\eta^TQ\Lambda}{\eta^TQ\Lambda Q^T\eta}\right)Q^T$$

Now if we define $\zeta=Q^T\eta$ and $\zeta_0$ to be the first r entries of $\zeta$, we get:

$$S - \frac{\xi\xi^T}{\xi^T\eta} = Q\begin{bmatrix} \Lambda_0 - \frac{\Lambda_0\zeta_0^T\zeta_0\Lambda_0}{\zeta_0^T\Lambda_0\zeta_0} & O \\ O & O \end{bmatrix}Q^T$$

Since Q is unitary, the rank of matrix $$S - \frac{\xi\xi^T}{\xi^T\eta}$$

is equal to the rank of $$\Lambda_0 - \frac{\Lambda_0\zeta_0^T\zeta_0\Lambda_0}{\zeta_0^T\Lambda_0\zeta_0},$$

which we defined as $\Phi_0$. Please note the following:

$$\Phi_0\zeta_0 = \Lambda_0\zeta_0 - \frac{\Lambda_0\zeta_0^T\zeta_0\Lambda_0}{\zeta_0^T\Lambda_0\zeta_0}\zeta_0 = \Lambda_0\zeta_0 - \Lambda_0\zeta_0 = 0$$

So matrix $\Phi_0$ is not a full rank matrix, i.e., rank ($\Phi_0$)≤r-1. This proves the theorem. □

If we assign $S=\Delta A_{i-1}$, $\eta=I_S$, $\xi=\Delta V_S$ in Theorem 4, we get $$\text{rank}(\Delta A_i) = \text{rank}\left(\Delta A_{i-1} - \frac{\Delta V_S \Delta V_S^T}{\Delta V_S^T I_S}\right) \leq \text{rank}(\Delta A_{i-1}) - 1$$

Now we have proven the correctness of the algorithm under the assumption that the actual coefficient matrix A will not change during the iterations. This turns out to be a reasonable assumption in the real world, because the speed of convergence is much faster than the speed at which A changes. Say that we have 10 transmitters, then we need at most 10 iterations to converge. The time needed for each iteration may be bounded by the speed of the processor on which the algorithm runs, which can finish the computation in less than 1 ms. If the devices are held by human beings, it will only move at most a distance of a few millimeters during the 1 millisecond processing time, therefore the changes in the channels can be ignored. In a real-world scenario with personal electronic devices as the receiver, the procedure almost always maintains a steady state.

Previously we have shown that the algorithm will converge within at most N iterations. In most cases it converges in much fewer than N iterations. This is because it is unlikely that all receivers are moving at the same time. We will show that the number of iterations needed is tied to the number of receivers moved during the procedure.

Let's first look at the case when only one receiver comes into the range, leaves the range, or moves from one location to another. Let $\Delta A$ be the change in the coefficient matrix, the following two theorems show that $\Delta A$ can be rank 1 or rank 2, but will not be more than rank 2.

Theorem 5:

$\Delta A$ is rank 1 if only one receiver comes into the range or leaves the range and all of the other receivers do not move.

Proof:

Note that coming into the range and leaving the range is reciprocal, so we only need to prove the case when a new receiver comes. Let us say before the receiver comes there are M receivers and N transmitters, so we have $A=\omega^2 M X_L M^T$ where M is of size N×M and $X_L$ is of size M×M. When a new receiver comes, both M and $X_L$ will expand their size, i.e., $$X'_L = \begin{bmatrix} X_L & m_L \\ m_L & z \end{bmatrix}, M' = [M \quad m]$$

where vector $m_L$ characterizes the coupling between the existing receivers to the new receiver, vector m contains the coupling between the transmitters to the new receiver, and z is the impedance of the new receiver.

Therefore, $$A' = [M \quad m] \begin{bmatrix} X_L & m_L \\ m_L & z \end{bmatrix}^{-1} [M \quad m]^T$$

$$= [M \quad m] \begin{bmatrix} X_L^{-1} + \frac{1}{z} X_L^{-1} m_L m_L^T X_L^{-1} & -\frac{1}{z} X_L^{-1} m_L \\ -\frac{1}{z} m_L^T X_L^{-1} & \frac{1}{z} \end{bmatrix} [M \quad m]^T$$

$$= A + \frac{1}{z}(M X_L^{-1} m_L - m)(M X_L^{-1} m_L - m)^T$$

If we define $v = M X_L^{-1} m_L - m$, we get $$\Delta A = \frac{1}{z} v v^T,$$

i.e., $\Delta A$ is a rank-1 matrix.

Theorem 6: $\Delta A$ is at most rank 2 if only one receiver moves and all of the other receivers do not move.

Proof:

The event that one receiver moves is equivalent to a sequence of two events: (1) that specific receiver leaves, then (2) comes back into range with new channels. In theorem 5, we proved that each of these two events is a rank-1 update, so they add up to at most a rank-2 update.

By theorem 5 and 6, the procedure needs at most two iterations to converge if during that time only one receiver changes. This conclusion can be generalized to any number of receivers, see theorem 7:

Theorem 7:

$\Delta A$ is at most rank min(2p,N) where N is the number of transmitters, if only p receiver moves and all of the other receivers do not move.

Proof:

The event that p receivers move can be simulated by a series of p events, with each event involving only one receiver moving. By theorem 6, each of these events is at most rank 2. Therefore, the total rank will be at most 2p. □

Another issue is robustness of the procedure. It turns out that the procedure is robust to both errors and noises. Specifically, let's consider two cases that might occur in real world:

Example 1: due to bugs in the hardware or software, the estimation of matrix A is corrupted. In this case, the algorithm can correct itself in N iterations. We call this a self-correcting property since the algorithm can recover from a completely incorrect state quickly without any explicit error-checking Example 2: for some reason there is significant noise in the measurement of voltages $V_S$ and $I_S$. In this case, this measurement noise will not accumulate from one iteration to the next. This is important, because otherwise after many iterations the accumulated noises will overwhelm the actual estimation. The reason why we are not accumulating noises is because we are always operating on the difference of previous estimation $\tilde{A}$ and the actual A. Any noise in the previous measurement create estimation errors in $\tilde{A}$, which will in turn be captured by estimating $A - \tilde{A}$. In other words, in each iteration, we are not only estimating the updates in the channels, but also the errors made previously.

In previous sections, a procedure that iteratively maximizes the total power delivered to one or more receivers with zero overhead due to channel estimation is described. In this section, an alternative design approach is presented. Specifically, the approach facilitates explicit fairness. As explained before, Procedure 2 guarantees implicit fairness which grants priority to device with lower battery level. However, in some use cases, the user might want to have some explicit fairness demand. For example, she might want her iPhone to be given higher priority and be charged before her iPad, regardless of the battery levels. To cope with such scenarios, we can alternatively assign explicit weights $W_u \geq 0$ to each receiver u, for example, set by the system and/or based on communication from the receivers. The smaller $W_u$ is, the higher the priority assigned to the corresponding receiver. Thus, the objective function is defined as:

$$\max I^*_L W I_L, \text{ where } W = \text{diag}(W_1, W_2, \ldots, W_M)$$

Under this definition, Procedure 2 can be viewed as a special case where $W_u$ is equal to $R_u$.

Theorem 8:

Given the objective function defined above, the optimal solution $I_S'$ is:

$$I_S' = \sqrt{R_S^{-1}} \, V(\sqrt{I + \Sigma^2})^{-1} \text{maxeig}\left(\frac{\Sigma}{\sqrt{I + \Sigma^2}} U^* R_L^{-1} W U \frac{\Sigma}{\sqrt{I + \Sigma^2}}\right)$$

where U is the matrix whose columns are left-singular vectors of $\sqrt{R_L}H\sqrt{R_S^{-1}}$ while $\Sigma$ is a diagonal matrix containing the singular values.

Proof:

The optimization problem introduced above can be expressed as $$\max I_L^* W I_L$$
$$\text{s.t.} \quad I_S^* R_S I_S + I_L^* R_L I_L = P$$
$$I_L = H I_S$$

Substituting $x=\sqrt{R_S}I_S$, $y=\sqrt{R_L}I_L$, $W'=R_L^{-1}W$, and $H'=\sqrt{R_L}H\sqrt{R_S^{-1}}$, then the optimization problem can be rewritten as:

$$\max y^* W' y$$
$$\text{s.t.} \quad x_2^2 + y_2^2 = P$$
$$y = H' x$$

Assume the SVD decomposition of the matrix H' yields H'=U$\Sigma$V*. Then $$P = x^*x + y^*y = x^*x + x^*V\Sigma^2 V^*x = x^*V(I+\Sigma^2)V^*x$$

Defining $x' = \sqrt{I+\Sigma^2}V^*X$, then the constraints can be reduced to $\|x'\|_2^2 = P$.

Following the definition of x', the relationship between y and x' can be written as:

$$y = H'x = U\Sigma V^* V\left(\sqrt{I+\Sigma^2}\right)^{-1} x' = U\frac{\Sigma}{\sqrt{I+\Sigma^2}} x'$$

Therefore, the objective function is $$y^* W' y = (x')^* \frac{\Sigma}{\sqrt{I+\Sigma^2}} U^* W' U \frac{\Sigma}{\sqrt{I+\Sigma^2}} x'$$

Defining the middle matrix as $$\Psi = \frac{\Sigma}{\sqrt{I+\Sigma^2}} U^* W' U \frac{\Sigma}{\sqrt{I+\Sigma^2}},$$

further, its Hermitian decomposition is $\Psi = Q\Lambda Q$, then $$y^* W' y = (x')^* \Psi x' = (Q^*x')^* \Lambda (Q^*x')$$

Following the similar proof of theorem 2, the optimal solution is x'=maxeig($\Psi$). After a series of substitution, the optimal $I_S'$ is:

$$I_S' = \sqrt{R_S^{-1}} V\left(\sqrt{I+\Sigma^2}\right)^{-1} \text{maxeig}\left(\frac{\Sigma}{\sqrt{I+\Sigma^2}} U^* R_L^{-1} W U \frac{\Sigma}{\sqrt{I+\Sigma^2}}\right)$$

where U$\Sigma$V* is the SVD decomposition of matrix $\sqrt{R_L}H\sqrt{R_S^{-1}}$. $\square$ Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

APPENDIX

| 1 | Procedure 1 — Beamforming with one receiver |
|---|---|

```
Procedure SINGLERECEIVERBEAMFORMING( X )
    [ M₀,Y ] ← Bootstrap( X )                   ▷ Bootstrap the system
    SingleReceiverIteration( X, M₀, Y)          ▷ Iteratively beamform and estimate
    M₀ and Y
End Procedure
Procedure BOOTSTRAP( X )
    iter ← 1
    while true
        apply voltage: V_S ∝ (itermodN )-th column of X
```

APPENDIX-continued

```
M₀ ← V_S - XI_S                          ▷ Diagonalize the current
if M_{02}² > 0                           ▷ When we detect a receiver
```

$$Y \leftarrow \left( X + \frac{M_0 M_0^T}{M_0^T I_S} \right)$$

```
    return [ M₀,Y ]
  end if
  iter ← iter +1
  end while
End Procedure
Procedure SINGLERECEIVERITERATION( X, M₀, Y )
  while true
    apply voltage: V_S ∝ YM₀             ▷ Apply the beamforming voltages
    M₀ ← V_S - XI_S                      ▷ Update the magnetic channel
```

$$Y \leftarrow \left( X + \frac{M_0 M_0^T}{M_0^T I_S} \right) \quad \triangleright \text{ Update the coefficient matrix}$$

```
  end while
End Procedure
```

2  Procedure 2 — Multiple Receiver Iteration

```
Procedure MULTIPLERECEIVERSITERATION( A , X_S)
  while true
    I_S' ← maxeigen(ℝ[ A ])              ▷ Calculate the beamforming currents
    apply voltage: V_S' = (A +X_S )I_S'  ▷ Apply the beamforming voltages
    measure voltage V_S and current I_S
```

$$A \leftarrow A + \frac{\Delta V_S \Delta V_S^T}{\Delta V_S^T I_S}, \text{ where } \Delta V_S = V_S - (X_S + A)I_S \quad \triangleright \text{ Calculate the update to matrix A}$$

```
  end while
End Procedure
```

What is claimed is:

1. A method for wireless power transfer using a transmitter having a plurality of transmitter coils that are magnetically coupled to one or more receiver coils, the one or more receiver coils being electrically coupled to one or more circuits wirelessly powered from the transmitter, the method comprising:
   maintaining first data characterizing an electrical effect on the transmitter by the one or more receiver coils electrically coupled to the one or more circuits;
   determining second data which characterizes a periodic excitation of the plurality of transmitter coils by using the first data;
   causing the periodic excitation of the plurality of the transmitter coils according to the second data;
   wherein maintaining the first data includes updating the first data using third data characterizing a response of each transmitting coil to the periodic excitation applied to the plurality of transmitting coils.

2. The method of claim 1 wherein the one or more receiver coils comprises a plurality of receiving coils.

3. The method of claim 2 wherein the one or more circuits comprise a plurality of circuits, each circuit of the plurality being coupled to a different receiving coil of the plurality of receiver coils.

4. The method of claim 1 wherein at least one of the one or more receiver coils is movable relative to the transmitter coils of the transmitter.

5. The method of claim 4 wherein the first data depends at least in part on location of the one or more receiver coils relative to the transmitter coils, and wherein maintaining the first data includes adapting to changing location of the one or more receiver coils.

6. The method of claim 1 wherein the one or more circuits apply a load to each of the one or more receiver coils, and wherein the first data depends at least in part on the loads applied to the one or more receiver coils.

7. The method of claim 6 wherein the load applied to at least one of the receiver coils varies over time, and wherein maintaining the first data includes adapting to changing load applied to said at least one of the receiver coils.

8. The method of claim 1 wherein the first data depends at least in part on magnetic coupling between each transmitter coil of the plurality of transmitter coils and each receiver coil of the one or more receiver coils, and wherein maintaining the first data comprises adapting to changes in said magnetic coupling.

9. The method of claim 8 wherein the first data further depends at least in part on magnetic coupling between the transmitter coils of the plurality of transmitter coils.

10. The method of claim 8 wherein the first data further depends at least in part on magnetic coupling between the receiver coils of the one or more receiver coils.

11. The method of claim 1 wherein at least one of the circuits comprises a charging circuit for a battery, and wherein the electrical effect on the transmitter of the one or more receiver coils depends at least in part on a charging state of said battery.

12. The method of claim 8 wherein a load of the charging circuit on a receiver coil coupled to the charging circuit depends on the charging state of the battery, and wherein maintaining the first data includes adapting to the charging state of one or more batteries.

13. The method of claim 1 wherein causing the excitation of the plurality of transmitter coils comprises controlling one or more power conversion circuits electrically coupled to the plurality of transmitter coils.

14. The method of claim 1 further comprising measuring the response of each transmitter coil to determine the third data.

15. The method of claim 14 wherein measuring the response of each transmitter coil includes measuring a current in each transmitter coil.

16. The method of claim 15 wherein measuring the current comprises measuring a magnitude and phase of the current in each transmitter coil.

17. The method of claim 15 wherein measuring the current includes sensing the current using an inductive coupling to each of the transmitter coils.

18. The method of claim 1 comprising performing a series of iterations, each iteration including
   determining the second data,
   causing the excitation of the transmitter coils, and
   updating the first data.

19. The method of claim 18 wherein the repeating is performed during substantially continuous transfer of power via the plurality of transmitter coils and the one or more receiver coils.

20. The method of claim 1 wherein determining the second data comprises determining said data to substantially optimize transfer of power via the one or more receiver coils.

21. The method of claim 20 wherein determining the second data is performed without requiring communication between the transmitter and the circuits coupled to the receiver coils.

22. The method of claim 1 wherein the second data characterizing the excitation of the plurality of transmitter coils comprises data characterizing at least one of a voltage excitation and a current excitation for at least some of said transmitter coils.

23. The method of claim 1 wherein the second data characterizing the excitation of the plurality of transmitter coils comprises data characterizing a phase of the periodic excitation for at least some of the transmitter coils.

24. The method of claim 23 wherein the second data characterizes a voltage and a phase of periodic excitation of each of the transmitter coils.

25. The method of claim 1 further comprising:
   detecting a change in a number of the one or more receiving coils in proximity to the transmitter according to the third data.

26. The method of claim 25 wherein detecting the change includes determining that the electrical effect on the transmitter of the one or more receiver coils characterized by the first data is significantly different than the third data characterizing the response of each transmitting coil to the periodic excitation applied to said coil.

27. The method of claim 1 further comprising, during a period in which no receiving coil is in a proximity to the transmitter, detecting entry of a receiver coil of the one or more receiver coils into the proximity of the transmitters, and initializing the first data upon entry of said receiver coil.

28. The method of claim 27 wherein detecting entry of the receiver coil comprising iteratively causing excitation of successively different subsets of the plurality of transmitting coils in each of a succession of detection cycles, and using the third data characterizing a response of each transmitter coil to detect the entry of the receiver coil.

29. The method of claim 28 wherein each different subset consists of a single transmitting coil.

30. The method of claim 28 wherein causing excitation of a subset of the plurality of transmitter coils includes controlling one or more power conversion circuits electrically coupled to the plurality of transmitter coils to apply a drive to each of the transmitter coils.

31. The method of claim 30 further comprising determining fourth data characterizing the excitation of the plurality of transmitter coils such that in the absence of a receiver coil entering the proximity of the transmitter, current in transmitter coils outside the selected subset is substantially zero, and wherein causing excitation of the subset of the plurality of transmitter coils includes causing excitation of the plurality of transmitter coils according to the fourth data.

32. A wireless power transfer system comprising:
   a plurality of transmitter coils;
   one or more power conversion circuits controllable to apply an excitation to each of the plurality of transmitter coils;
   measurement circuits for measuring a response at each of the transmitter coils to the excitation of said transmitter coils; and
   a controller coupled to the power conversion circuits and to the measurement circuits, said controller being configured to
   maintain first data characterizing an electrical effect on the transmitter of the one or more receiver coils electrically coupled to the one or more circuits;
   determine second data which characterizes a periodic excitation of the plurality of transmitter coils by using the first data;
   cause the periodic excitation of the plurality of transmitter coils according to the second data;
   wherein maintaining the first data includes updating the first data using third data characterizing a response of each transmitting coil to the periodic excitation applied to the plurality of transmitting coils.

33. The system of claim 32 wherein the controller comprises a processor and a non-transitory machine readable medium comprising instructions stored thereon.

34. A non-transitory machine readable medium comprising instructions for causing a controller of a wireless power transfer system to:
   maintain first data characterizing an electrical effect on the transmitter of the one or more receiver coils electrically coupled to the one or more circuits;
   determine second data which characterizes a periodic excitation of the plurality of transmitter coils by using the first data;
   cause the periodic excitation of the plurality of transmitter coils according to the second data;
   wherein maintaining the first data includes updating the first data using third data characterizing a response of each transmitting coil to the periodic excitation applied to the plurality of transmitting coils.

35. The method of claim 1 wherein the first data characterizes a magnetic coupling between each transmitter coil of the plurality of transmitter coils.

36. The method of claim 35 wherein the third data characterizes a magnetic coupling between transmitter coils of the plurality of transmitter coils.

37. The method of claim 21 wherein the at least one of the voltage excitation and the current excitation is determined from a plurality of non-zero excitation values.

38. The method of claim 37 wherein the plurality of non-zero excitation values are continuous.

\* \* \* \* \*